United States Patent [19]
Rosenberg et al.

[11] Patent Number: 6,046,297
[45] Date of Patent: Apr. 4, 2000

[54] POLYURETHANES CURED WITH 4,4'-METHYLENE-BIS-(3-CHLORO-2,6-DIETHYLANILINE-METHYLENE

[75] Inventors: Ronald Owen Rosenberg, Shelton; Ajaib Singh, Huntington; Ronald Walter Fuest, Newtown, all of Conn.

[73] Assignee: Uniroyal Chemical Company, Inc., Middlebury, Conn.

[21] Appl. No.: 08/758,067

[22] Filed: Nov. 27, 1996

Related U.S. Application Data

[62] Division of application No. 07/987,501, Dec. 7, 1992, abandoned.

[51] Int. Cl.$^7$ .................................................. C08G 18/10
[52] U.S. Cl. ................................ 528/63; 528/64; 528/67
[58] Field of Search .............................. 528/63, 64, 67; 252/182.22

[56] References Cited

U.S. PATENT DOCUMENTS

| | | | |
|---|---|---|---|
| 3,839,491 | 10/1974 | Gamero | 528/59 |
| 3,997,514 | 12/1976 | Kozan | 528/67 |
| 4,182,825 | 1/1980 | Jackele | 528/44 |
| 4,623,709 | 11/1986 | Bauriedal | 528/67 |
| 4,786,703 | 11/1988 | Starmer | 528/63 |
| 4,950,792 | 8/1990 | Althaus et al. | 564/335 |
| 4,957,959 | 9/1990 | Matsumoto et al. | 528/67 |
| 5,077,371 | 12/1991 | Singh et al. | 528/64 |
| 5,183,877 | 2/1993 | Swanson | 528/64 |
| 5,202,001 | 4/1993 | Starmer et al. | 560/352 |

FOREIGN PATENT DOCUMENTS

| | | |
|---|---|---|
| 0220641 | 5/1987 | European Pat. Off. . |
| 0387894 | 9/1990 | European Pat. Off. . |

OTHER PUBLICATIONS

CA 151425c; vol. 117, No. 16, Oct. 1992; "New Extending Agent for PU".

Encyclopedia of Polymer Science & Engineering; vol. 13, 1988, John Wiley & Sons; pp. 262–263.

CA 238352w; vol. 107, No. 26, Dec., 1987; T. Voelker; "A New Non Toxic Replacement for MBOCA".

CA 111851; vol. 109, No. 14; Oct. 1988; T. Voelker; "A New Chain Extender for Cast PU Elastomers".

CA 200345; vol. 112, No. 22, May 1990; R. Cody; "PU Prepolymer Curative".

CA 8651t; vol. 117, No. 2, Jul. 1992; "Isocyanate–Containing Mixtures of Polyurea Prepolymers".

*Primary Examiner*—Rachel Gorr
*Attorney, Agent, or Firm*—Daniel Reitenbach

[57] ABSTRACT

Polyurethane prepolymers are disclosed prepared with mononuclear aromatic diisocyanate such as toluene diisocyanate and an aliphatic diisocyanate such as H12MDI. These prepolymers can be cured with 4,4'-methylene-bis-(3-chloro-2,6-diethylaniline) to form a cured urethane elastomer with reduced propensity to crack during the curing process, extended pour life (a slower rate of viscosity buildup after curative and prepolymer are mixed), low hysteresis, and a low level of free toluene diisocyanates and/or other toxic or volatile substances to increase worker safety during processing. It has also been found that prepolymers made from toluene diisocyanate and cured with a blend of two aromatic diamine curatives yields urethane elastomers with the same reduced propensity to crack during the curing process.

3 Claims, No Drawings

POLYURETHANES CURED WITH 4,4'-METHYLENE-BIS-(3-CHLORO-2,6-DIETHYLANILINE-METHYLENE

This is a Division of application Ser. No. 07/987,501, filed Dec. 7, 1992, now abandoned.

BACKGROUND OF THE INVENTION

1. Field of the Invention

This invention relates to castable polyurethane and/or polyurethane/urea elastomer compositions with low hysteresis and improved processing characteristics, including longer pour life, reduced tendency to crack, and reduced presence of toxic free toluene diisocyanate monomer or other mononuclear aromatic diisocyanate monomers. Isocyanate-endcapped prepolymers are employed. Effective processes for the production of such prepolymers and elastomers are disclosed.

2. Description of Related Art

Aromatic polyisocyanates are well known and are widely used in the preparation of polyurethane and polyurethane/urea elastomers. These aromatic diisocyanates generally include compositions such as 2,4-toluene diisocyanate, 2,6-toluene diisocyanate, 4,4'-methylene-bis-(phenylisocyanate) and the like. In the preparation of polyurethane and polyurethane/urea elastomers, the aromatic diisocyanates are reacted with a long chain (high molecular weight) polyol to produce a prepolymer containing free isocyanate groups. This prepolymer may then be chain extended with a short chain (low molecular weight) polyol or aromatic diamine to form a polyurethane or polyurethane/urea elastomer (known generically as polyurethane or urethane). A liquid mixture of prepolymer and curative polymerizes, increasing steadily in viscosity until finally a solid elastomer is formed.

Among the chain extenders or cross-linking agents used, primary and secondary polyalcohols, aromatic diamines, and in particular 4,4'-methylene-bis-(2-chloroaniline) (MBOCA) are most common. The use of MBOCA allows the manufacture of urethane elastomers with good mechanical properties and acceptable processing times.

Although MBOCA is the most widely used chain-extender in the production of castable polyurethanes, it suffers from the disadvantage of decomposition at high temperatures, as well as being quite toxic and Ames positive. The negative features of MBOCA have prompted those in the polyurethane art to investigate alternate materials as chain-extenders. Examples of other amines that have been used include 3,3',5,5'-tetraisopropyl-4,4'-diaminodiphenylmethane and 3,5-dimethyl-3',5'-diisopropyl-4,4'-diaminophenylmethane. While these amines do function as cross-linking agents, the resultant pot life of the polymer mixture is so short that no reasonable processing time for cast elastomers is possible.

Another curing agent used in the manufacture of polyurethanes is methylene dianiline(MDA), which is well-known to those in the art as a good curative if there is only aliphatic diisocyanate present. It has a much shorter pot life than MBOCA. This short pot life is exacerbated by the presence of TDI. There are also toxicity issues related to the use of MDA.

A different chain-extending agent for polyurethanes is 4,4'-methylene-bis-(3-chloro-2,6-diethylaniline) (MCDEA, available as Lonzacure, trademark of the Lonza Corporation). This curative material is reportedly lower in toxicity but faster than MBOCA to react with isocyanates. (See Th. Voelker et al, Journal of Elastomers and Plastics, 20, 1988 and ibid, 30th Annual Polyurethane Technical/Marketing Conference, October, 1986.) Although this curative does react with isocyanate-terminated prepolymers (including TDI-based prepolymers) to give elastomers with desirable properties, such as low hysteresis, they have a tendency to crack when undergoing polymerization.

The amount and presence of free, unreacted TDI monomer has other deleterious effects on the processing and manufacture of urethanes. A major problem with mononuclear aromatic diisocyanates, such as toluene diisocyanate, is that they are toxic and because of their low molecular weight tend to be quite volatile.

U.S. Pat. No. 5,077,371 to Singh et al discloses a prepolymer that is low in free TDI. U.S. Pat. No. 4,182,825 to Jackle also discusses polyether based prepolymers made from hydroxy terminated polyethers capped with toluene diisocyanate with the amount of unreacted TDI substantially reduced. These prepolymers can be further reacted with conventional organic diamines or polyol curatives to form polyurethanes. When combining the teachings of this patent with the use of MCDEA as a chain extender, the resulting solid elastomer goes through a gel stage having low strength which can allow cracking of the polymerization mass to occur. Conventional TDI prepolymers with higher levels of free TDI also yield the same unsatisfactory gel state.

Surprisingly, it has been found that certain prepolymers prepared with both TDI and an aliphatic diisocyanate can be used with MCDEA to give elastomers with both reduced propensity to crack and very low hysteresis. The prepolymers also provide extended pour life and reduced presence of toxic free TDI. An example of aliphatic diisocyanate would be a mixture of the three geometric isomers of 1,1'-methylene-bis-(4-isocyanatocyclohexane), abbreviated collectively as "H12MDI." One such mixture of isomers is available commercially as Desmodur W (trademark of the Miles Corporation).

These results are surprising. The low hysteresis of these compositions is particularly surprising in light of the poor (high) hysteresis ordinarily observed when H12MDI is employed in polyurethane compositions.

It has also been observed that using a blend of MCDEA with a small amount of MBOCA sharply reduces the weakness of the gel stage, resulting in a desirable reduction of propensity to crack. When MBOCA is incorporated into the curative, aliphatic diisocyanate need not be incorporated into the prepolymer to achieve a reduction in propensity to crack.

These results will become clear in the following description and illustrative examples.

BRIEF SUMMARY OF THE INVENTION

In accordance with the present invention, it has been discovered that castable polyurethane elastomers can be formulated with both low hysteresis and enhanced processing characteristics during the casting operation, including reduced tendency to crack, extended pour life, and reduced presence of toxic free TDI. The invention discloses an isocyanate-terminated prepolymer prepared with both toluene diisocyanate (TDI) and an aliphatic diisocyanate such as an isomeric mixture of 1,1'-methylene-bis-(4-isocyanatocyclohexane) [H12MDI, e.g. Desmodur W], said prepolymer being low in free TDI monomer and optionally low in free aliphatic diisocyanate monomer. Other examples of aliphatic diisocyanate that may be employed include the various pure geometric isomers of H12MDI; isophorone diisocyanate (IPDI); and 1,4-cyclohexane diisocyanate (CHDI) and mixtures thereof.

The prepolymer can be cured with an aromatic diamine curative such as 4,4'-methylene-bis-(3-chloro-2,6-diethylaniline) (MCDEA) to provide castable urethane articles with the desirable properties of low hysteresis and enhanced processing characteristics. This combination of desirable properties is particularly surprising in that H12MDI is known to impart undesirable high hysteresis in other polyurethane compositions employing aromatic diamine curatives.

Further examples of this invention show an unexpected advantage using a blend of two aromatic diamine curatives, particularly MCDEA and 4,4'-methylene-bis-(2-chloroaniline) ("MBOCA"). When such a curative blend is reacted with TDI prepolymer, it reduces the propensity of the polymerizing mass to crack. Both polyol and MBOCA are known to react more slowly than MCDEA with isocyanate prepolymers. However, MCDEA/polyol blends (which are known in the art) do not impart reduced propensity to crack. Therefore, it is surprising that MCDEA/MBOCA blends do exhibit this improvement.

The castable urethane elastomers of this invention possess 1) extended pour life (a slower rate of viscosity build-up after curative and prepolymer are mixed), 2) reduced propensity to crack during the curing process, 3) low hysteresis, and 4) a low level of free toluene diisocyanate and/or other toxic or volatile substances to increase worker safety during processing.

The urethane products will find use in industrial applications that require durable physical and mechanical properties in the final elastomers, such as low hysteresis and reduced tendency to crack. Industrial rolls such as paper mill rolls, industrial wheels, and industrial tires are applications that require such properties.

DETAILED DESCRIPTION OF THE INVENTION

In the practice of this invention, an organic diisocyanate, such as toluenediisocyanate, is reacted with high molecular weight polyester or polyether polyols to produce a prepolymer having free TDI below 0.4% by weight. Reducing the TDI to below 0.4% by weight may optionally be accomplished by a separation technique such as extraction, absorption, or distillation. Optionally a mixture of a low molecular weight polyol (Molecular weight<250) and a high Molecular weight polyol (molecular weight>250) may also be reacted with the diisocyanate.

Representative toluenediisocyanates include the two main isomers, i.e., the 2,4- and the 2,6-diisocyanate and optionally, a small amount of the ortho isomers, the 2,3- and 3,4-isomers. Commercially, toluene diisocyanate is found as a 65:35, 80:20 or 99:1 isomer mix of the 2,4- and 2,6-isomer by weight and optionally from 0–5% by weight of the ortho isomers. An isomer mix is preferred within a range, e.g., from 65–100% of the 2,4-isomer and the balance, i.e., 0–35%, being essentially the 2,6-isomer. The most preferred range of the 2,6-isomer is 15–35%. Other useful organic aromatic diisocyanates are those known conventionally such as MDI, TODI, PPDI, TDI dimer, etc.

High molecular weight polyols, namely polyether polyols or polyester polyols having a number average molecular weight of at least 250, are used to prepare the prepolymer of the instant invention. Molecular weight of about 500 to 3000 is preferred, with molecular weight of 1000 to 2000 being the most preferred. However, the molecular weight of the high molecular weight polyol may be as high as 10,000 or as low as 250.

The preferred polyalkyleneether polyols may be represented by the general formula $HO(RO)_nH$, wherein R is an alkylene radical and n is an integer large enough that the polyether polyol has a number average molecular weight of at least 250. These polyalkyleneether polyols are well-known components of polyurethane products and can be prepared by the polymerization of cyclic ethers (such as alkylene oxides) and glycols, dihydroxyethers, and the like by known methods.

The polyester polyols are prepared by reaction of dibasic acids (usually adipic acid but other components, such as glutaric, sebacic, or phthalic acid, may be present) with diols such as ethylene glycol, 1,2-propylene glycol, 1,4-butylene glycol, diethylene glycol, 1,6-hexanediol, and the like where linear polymer segments are required. Units of higher functionality such as glycerol, trimethylolpropane, pentaerythritol, sorbitol, and the like may be employed with either polyester polyols or polyether polyols if chain branching or ultimate cross-linking is sought.

Some polyester polyols employ caprolactone and dimerized unsaturated fatty acids in their manufacture. Another type of polyester of interest is that obtained by the addition polymerization of $\epsilon$-caprolactone in the presence of an initiator. Still other polyols that can be used are those having at least two hydroxyl groups and whose basic backbone is obtained by polymerization or copolymerization of such monomers as butadiene and isoprene monomers.

Preferred polyols of the current invention are polyalkylene ethers. Most preferred of this group of compounds include polytetramethylene ether glycols (PTMEG).

The total polyol blend portion of the instant invention can be a combination of high molecular weight polyol, as previously described, and low molecular weight polyol. An aliphatic glycol is the preferred low molecular weight polyol. Suitable aliphatic polyols are ethylene glycol, diethylene glycol, triethylene glycol, tetraethylene glycol, propylene glycol, dipropylene glycol, tripropylene glycol, neopentyl glycol, 1,3-butanediol, 1,4-butanediol, and the like.

The most preferred low molecular weight polyol is diethylene glycol. In general, the weight of the low molecular weight polyol should be no more than 20% of the combination of high molecular weight polyol and low molecular weight polyol. The preferred range is 0 to 15% of the combination; more preferred is 0–8%.

The TDI prepolymers are prepared by dissolving any toluene diisocyanates used with any other conventional diisocyanates optionally used, adding the polyol or polyol blend, and maintaining the temperature from room temperature to temperatures as high as 150° C. for times necessary to react all the available hydroxyl groups. Preferred reaction temperatures are 30° C. to 100° C.; more preferred are 50° C. to 85° C.

If necessary, free TDI in the prepolymer is reduced to a level below 0.4% by weight (more preferably below 0.2%, most preferably below 0.1%) by distillation, extraction, absorption or other standard separation processes. Aliphatic diisocyanate, eg H12MDI, and/or prepolymer prepared with aliphatic diisocyanate, is then added to the TDI prepolymer.

If aliphatic diisocyanate monomer is to be added to the prepolymer, the preferred monomer is H12MDI or another diisocyanate monomer of comparatively high molecular weight, low volatility, and low toxicity. If more volatile aliphatic diisocyanates (eg CHDI, IPDI) are employed, it is preferred that they be employed as their prepolymers to reduce their volatility. More preferably, the prepolymers of such volatile aliphatic diisocyanates as CHDI and IPDI could contain below about 0.4% by weight of free unreacted monomer. If necessary, free monomer can be removed by use of conventional separation techniques such as extraction, distillation, or absorption.

If prepolymer prepared from H12MDI (or other aliphatic diisocyanate) is to be added to the TDI prepolymer, the H12MDI prepolymer may be prepared in a manner similar to that for the TDI prepolymer. However, because of the slower reactivity with polyols of H12MDI versus TDI, higher reaction temperatures are employed. Preferred temperatures are 70° C. to 140° C.; more preferred are from 80° C. to 130° C. Free H12MDI may optionally be removed from the prepolymer by the traditional separation processes previously mentioned.

In preparing a prepolymer with either aromatic or aliphatic diisocyanates, stoichiometric ratio of isocyanate groups to hydroxyl groups in the reactants should preferably be from 1.5/1 to 20/1 although somewhat lower and higher ratios are permissible. When the ratio is much lower, the molecular weight of the isocyanate-terminated polyurethane becomes so large that the viscosity of the mass makes mixing of chain extenders into the prepolymer relatively more difficult. A ratio of 2 isocyanate groups to one hydroxyl group is the theoretical ratio for the end-capping of a difunctional polyalkyleneether or ester polyol with a diisocyanate. An excess approaching the 20/1 ratio will result in high levels of free diisocyanate in the mixture, which must be subsequently removed at greater cost. The preferred range is 1.7/1 to 4/1 for prepolymers of TDI, and 2/1 to 12/1 for prepolymers of H12MDI or other aliphatic diisocyanates.

Representative aliphatic diisocyanates include the following, as examples: hexamethylene diisocyanate (HDI); 1,3-xylylene diisocyanate (XDI); 1,1,4,4-tetramethylxylylene diisocyanate in its para- or meta-isomer forms (p-TMXDI, m-TMXDI); isophorone diisocyanate (IPDI); 1,4-cyclohexane diisocyanate (CHDI); and the geometric isomers of 1,1'-methylene-bis-4-(-isocyanatocyclohexane) (H12MDI). Preferred diisocyanates include H12MDI, CHDI, and IPDI. More preferred diisocyanates include H12MDI in its various isomeric forms, mixed or pure.

It is desired that about 30–95% of the isocyanate content of the final prepolymer be from the aromatic isocyanate monomer or prepolymer of the final composition, such as TDI. About 5–70% of the isocyanate should be from the aliphatic isocyanate monomer or prepolymer, for example, H12MDI.

The curative used for the prepolymer can be selected from a wide variety of conventional and well known organic diamine or polyol materials. Preferred materials are the aromatic diamines which are either low melting solids or liquids. Specifically preferred are the diamines, polyols, or blends thereof having a melting point below 120° C. These diamines or polyols are generally the present ones used in the industry as curatives for polyurethane. The selection of a curative is generally based on reactivity needs, property needs for a specific application, process condition needs, and pot life desired. Known catalysts may be used in conjunction with the curative.

As previously mentioned, the most preferred curative is MCDEA, optionally in blends with MBOCA. Other curatives that can be blended with MCDEA include diethyl toluene diamine (DETDA), tertiary butyl toluene diamine (TBTDA), dimethylthio-toluene diamine (Ethacure™ 300) from Ethyl Corporation, trimethylene glycol di-p-amino-benzoate (Polacure™ 740) from Air Products and Chemicals Inc., and 1,2-bis(2-aminophenylthio)ethane (Cyanacure) from American Cyanamid Company.

For curing these prepolymers, the number of —NH$_2$ groups in the aromatic diamine component should be approximately equal to the number of —NCO groups in the prepolymer. A small variation is permissible but in general from about 80 to 110% of the stoichiometric equivalent should be used, preferably about 85 to 100%.

The reactivity of isocyanato groups with amino groups varies according to the structure to which the groups are attached. As is well known, as for example in U.S. Pat. No. 2,620,516, some amines react very rapidly with some isocyanates while others react more slowly. In the latter case, it is optional to use catalysts to cause the reaction to proceed fast enough to make the product non-sticky within 30–180 seconds. However, more often it is preferable that the prepolymer/curative blend remains flowable (below 50 poise) for at least 120 seconds and more preferably for at least 180 seconds.

For some of the aromatic diamines, the temperature of the reaction or of the polyurethane reactants will need only be controlled in order to obtain the proper reaction time; thus, for a diamine that ordinarily would be too reactive, a catalyst would be unnecessary; a lowering of the reaction temperature would suffice. A great variety of catalysts is available commercially for accelerating the reaction of the isocyanato groups with compounds containing active hydrogen atoms (as determined by the well-known Zerewitinoff test). It is well within the skill of the technician in this field to select catalysts to fit particular needs and adjust the amounts used to further refine the conditions. Adipic acid and triethylene diamine (available under the trademark Dabco™ from Air Products and Chemicals, Inc.) are typical of suitable catalysts.

The following examples are meant for illustrative purposes only and are not intended to limit the scope of this invention in any manner whatsoever.

COMPARATIVE EXAMPLES A–H

EXAMPLES 1–6

PROCESSABILITY STUDIES

In these Examples various prepolymers were cured with various curatives or curative blends to assess the processing characteristics of the combined systems. Properties measured included the useful working life (pour life) of the prepolymer/curative mixture, the propensity to crack, and the final hardness of the system. The prepolymer/curative compositions are listed in Table I; he properties measured are listed in Table II.

As listed in Table I, 300 grams of each prepolymer of Comparative Examples A–H and Examples 1–6 were weighed into 500 ml metal cans. In some cases, blends were prepared from prepolymer and H12MDI (Desmodur W) to total 300 g. The materials were heated to approximately 100° C., then placed in a vacuum chamber to remove any dissolved gases. The cans were then sealed with a nitrogen flush and allowed to cool to about 53° C. in a forced air oven, establishing a uniform temperature throughout the prepolymer mass. The equilibrated temperature of the prepolymer was taken shortly before the prepolymer was mixed with curative.

Similarly, a metal can of the curative or curative blend was heated to the desired temperature of about 105° C. The temperature was checked shortly before the addition of the curative to the prepolymer.

Curative was poured into the can of prepolymer on a balance. Unless otherwise indicated, curative was added at a level to give a combination of amine and hydroxyl groups at about 95% + or −6% (89 to 101%) of the available isocyanate groups in the prepolymer on an equivalent basis ("curative level" in Table 1). After the desired amount had been added, the system was hand-mixed with a spatula for about one minute.

The can was then placed on a piece of corrugated cardboard on a bench top for thermal insulation. A Brookfield viscometer, equipped with an RV #7 spindle operating at 20 rpm, was used to record the viscosity buildup to 2000 poise over time. The times taken to reach 50, 200, and 2000 poise were used to approximate useful working pour life and are recorded in Table II. While the maximum viscosity allowable for pouring depends on the individual application, the time to 50 poise is considered to have the broadest relevance.

After the reaction mass had reached 2000 poise, the Brookfield viscometer and spindle were removed. The reaction mass was then pierced with a fresh RV#7 spindle to approximately 5 mm immersion for several seconds, after which the spindle was withdrawn. The reaction mass was inspected for signs of cracking from the applied stress of the inserted spindle.

This procedure simulated the internal stresses that occur naturally from shrinkage in a large polymerizing reaction mass. The tendency to crack was inspected over time by piercing the mass repeatedly until at least 15 minutes, or until the reaction mass had become less deeply penetrable and finally inpenetrable. A critical period of maximum propensity to crack was observed. This period typically occurred well after the mass had reached 2000 poise, but before it had become difficult to pierce. Often, the reaction mass went through a stage with the consistency of gelatin.

The cans of material were allowed to fully polymerize overnight in a 100° C. oven. Rex A and/or Rex D hardnesses were measured by hand at intervals during the polymerization and after the fully polymerized cans had been allowed to cool to room temperature. Pencil-type Rex gauges were used for the hardness determinations.

TABLE I

COMPOSITIONS OF PREPOLYMER/CURATIVE SYSTEMS FOR PROCESSABILITY

| EXAMPLE OR COMPARATIVE EXAMPLE | A | B | C | D | E | F | F' | G | H |
|---|---|---|---|---|---|---|---|---|---|
| PREPOLYMER | | | | | | | | | |
| ADIPRENE ® LF60* (g) | 300 | | | 300 | | | | | |
| ADIPRENE L167* (g) | | 300 | | | | | | | |
| ADIPRENE LF70* (g) | | | 300 | | | | | 300 | 300 |
| ADIPRENE LF95* (g) | | | | | 300 | | | | |
| ADIPRENE LF90* (g) | | | | | | 300 | 300 | | |
| H12MDI | | | | | | | | | |
| % NCO CONTENT, APPROX. | 7.2 | 6.5 | 8.2 | 7.2 | 6.1 | 3.8 | 3.8 | 8.2 | 8.2 |
| % FREE TDI CONTENT, APPROX. | <0.1 | 2.0 | <0.1 | <0.1 | <0.1 | <0.1 | <0.1 | <0.1 | <0.1 |
| CURATIVE | | | | | | | | | |
| MBOCA (g) | 66 | | | | | | | | |
| MCDEA (g) | | 86 | 106 | 93 | 79 | 49 | 52 | 81 | 96 |
| PTMEG 1000 (g) | | | | | | | | | 24 |
| CURATIVE LEVEL, APPROX. ** | 0.95 | 0.95 | 0.95 | 0.95 | 0.95 | 0.95 | 1.01 | 0.73 | 0.95 |

| EXAMPLE OR COMPARATIVE EXAMPLE | 1 | 1' | 2 | 3 | 4 | 5 | 6 |
|---|---|---|---|---|---|---|---|
| PREPOLYMER | | | | | | | |
| ADIPRENE ® LF60* (g) | | | | | | | |
| ADIPRENE L167* (g) | | | | | | | |
| ADIPRENE LF70* (g) | | | | | 300 | | |
| ADIPRENE LF95* (g) | 258 | 258 | | | | 300 | |
| ADIPRENE LF90* (g) | | | 258 | 237 | | | 300 |
| H12MDI | 42 | 42 | 42 | 63 | | | |
| % NCO CONTENT, APPROX. | 9.7 | 9.7 | 7.8 | 9.7 | 8.2 | 6.1 | 3.8 |
| % FREE TDI CONTENT, APPROX. | <0.1 | <0.1 | <0.1 | <0.1 | <0.1 | <0.1 | <0.1 |
| CURATIVE | | | | | | | |
| MBOCA (g) | | | | | 20 | 15 | 9.0 |
| MCDEA (g) | 126 | 126 | 102 | 126 | 79 | 58 | 36 |
| PTMEG 1000 (g) | | | | | | | |

TABLE I-continued

COMPOSITIONS OF PREPOLYMER/CURATIVE SYSTEMS FOR PROCESSABILITY

| | | | | | | | |
|---|---|---|---|---|---|---|---|
| CURATIVE LEVEL, APPROX. ** | 0.95 | 0.95 | 0.97 | 0.95 | 0.96 | 0.95 | 0.95 |

*Adiprene LF60, L167, LF70, LF95, and LF90 are commercially available prepolymers with TDI and PTMEG as major components. (Adiprene is a registered tradename of the Uniroyal Chemical Company, Inc.)
**Curative level is computed as (aromatic amine groups and aliphatic hydroxyl groups)/(all isocyanate groups).

TABLE II

STUDIES OF PROCESSABILITY (POUR LIFE, PROPENSITY TO CRACK)

| EXAMPLE OR COMPARATIVE EXAMPLE | A | B | C | D | E | F | F' | G | H |
|---|---|---|---|---|---|---|---|---|---|
| POUR LIFE, MINUTES, APPROX. | | | | | | | | | |
| TIME TO 50 POISE | 5.4 | 2.8 | 1.9 | 2.8 | 3.4 | 6.6 | 5..9 | 2.1 | 1.7 |
| TIME TO 200 POISE | 7.4 | 3.8 | 2.5 | 3.3 | 3.9 | 8.6 | 7.5 | 2.7 | 2.3 |
| TIME TO 2000 POISE | 8.9 | 4.6 | 2.9 | 3.5 | 4.5 | 10.5 | 9.1 | 3.2 | 2.9 |
| CRACKING* | | | | | | | | | |
| TIME OF CRACKING STAGE, MINUTES AFTER MIXING | NONE OBSERVED | 12–15* (SLIGHT) | 5.5* | 6–10* | 1–15* | 20–45* | 18–60* | 5–9* | 4–7* |
| FINAL HARDNESS AT ROOM TEMPERATURE, Rex D | 63 | 63 | 75 | 71 | 64 | 46 | 45 | 73 | 72 |

| EMAMPLE OR COMPARATIVE EXAMPLE | 1 | 1' | 2 | 3 | 4 | 5 | 6 |
|---|---|---|---|---|---|---|---|
| POUR LIFE, MINUTES, APPROX. | | | | | | | |
| TIME TO 50 POISE | 3.1 | 3.2 | 4.0 | 4.1 | 2.0 | 4.2 | 7.7 |
| TIME TO 200 POISE | 3.4 | 3.6 | 5.2 | 4.7 | 2.7 | 4.8 | 10.2 |
| TIME TO 2000 POISE | 3.9 | 4.1 | 6.0 | 5.3 | 3.2 | 5.7 | 12.9 |
| CRACKING* | | | | | | | |
| TIME OF CRACKING STAGE, MINUTES AFTER MIXING | LITTLE TO NO CRACKING WAS OBSERVED | | LITTLE TO NONE OBSERVED | NONE OBSERVED | NONE OBSERVED | 14–15* | 25–60* |
| FINAL HARDNESS AT ROOM TEMPERATURE, Rex D | 75 | 75 | 65 | 72 | 74 | 61 | 43 |

*Asterisk denotes cracking

Comparative Example A presents a prepolymer/curative system that is commercially used in production of industrial rolls. Adiprene LF 60, a prepolymer consisting primarily of TDI and PTMEG and having below 0.1% free TDI, was cured with MBOCA. Pour life was 5.4 minutes (time to 50 poise). No cracking was observed. This system exhibits desirable processing characteristics. Typical hardness is about 60 to 65 Rex D.

Comparative Example B presents some of the deficiencies of conventional high free TDI prepolymers cured with MCDEA. Adiprene L 167, a commercial prepolymer consisting primarily of TDI and PTMEG and having about 2% free TDI, was cured with MCDEA. Pour life was only 2.8 minutes. Cracking occurred between 11.5 and 15 minutes. Final hardness was about 63 Rex D.

Comparative Examples C, D, E, F, and F' show the deficiencies of conventional low free TDI prepolymers cured with MCDEA. A series of commercial prepolymers consisting primarily of TDI and PTMEG, each containing below 0.1% free TDI, was cured with MCDEA. The chief differences among these prepolymers were in the % NCO content (ranging from 3.8% to 8.2%) and in the resulting amount of MCDEA required to cure the prepolymer. This led to a range of hardnesses (45 to 75 Rex D) in the final cured elastomers.

Each of these casting systems exhibited a tendency to crack. The cracking was induced most easily in the lower hardness systems, which also exhibited the longest pour life and the longest time to reach a state of impenetrability. Comparative Examples F and F', which had the lowest hardnesses, could be penetrated until 60 minutes after admixture of the prepolymer and MCDEA. By contrast, Comparative Example C, the highest hardness composition, had a pour life of only 1.9 minutes and only a brief period of comparatively slight propensity to crack under the conditions of this test.

The limited effects of change in MCDEA curative level are illustrated in Comparative Examples F and F', and in Comparative Examples C and G. Variations in curative level in the range 0.73 to 1.01 have only minor influence on the pour life or the propensity to crack. Improvements in both properties remain desirable.

Comparative Examples C and H show the unsuitable effects of preblending MCDEA and polyol (PTMEG 1000). Such curative blends are known. In H, an 80/20 blend by weight of MCDEA and PTMEG 1000 was used in place of pure MCDEA, holding curative level constant at 0.95. The prepolymer type was held constant. Pot life was slightly reduced and propensity to crack was significantly increased by use of this curative blend.

Examples 1, 1', 2, and 3 show the benefits of prepolymers prepared with both TDI and H12MDI and having low levels of free TDI monomer. In these Examples H12MDI (Desmodur W) was added to low free TDI prepolymers in varying amounts, and the resulting prepolymers were cured with MCDEA. The resulting elastomers had hardnesses in the range of 65 to 75 Rex D. In each case, the propensity to crack was significantly reduced and the pour life was significantly extended, in comparison with the systems of similar Rex D hardness in Comparative Examples B through H.

Examples 4, 5, and 6 demonstrate the benefits of MCDEA/MBOCA blends. In these Examples an 80/20 weight blend was used to cure three different low free TDI prepolymers. Resulting hardnesses ranged from 43 to 74 Rex D. Compared with the systems of similar hardness in Comparative Examples B through H, a reduced propensity to crack is noted.

The surprising nature of these results is particularly illustrated by the comparison between Example 4 (80/20 MCDEA/MBCA blend) and Comparative Example H (80/20 MCDEA/PTMEG 1000 blend), at 72–74 Rex D hardness. Both MBOCA and PTMEG 1000 are known to react more slowly than MCDEA with prepolymer. However, these added curatives exert opposite effects on the propensity to crack.

TABLE III

| COMPOSITIONS(*) OF PREPOLYMER/CURATIVE SYSTEMS FOR DYNAMIC PROPERTIES | | | | | | |
|---|---|---|---|---|---|---|
| EMAMPLE OR COMPARATVE EXAMPLES | I | J | K | L | M | N |
| COMPOSITION OF TABLES I AND II | | A | | | | |
| PREPOLYMER | | | | | | |
| ADIPRENE ® LF 90 (Parts by Wt.) | | | | | | |
| ADIPRENE LF 95 (Parts by Wt.) | 300 | | | | 279 | 258 |
| ADIPRENE LF 60 (Parts by Wt.) | | 300 | | | | |
| ADIPRENE LF 70 (Parts by Wt.) | | | | | | |
| ADIPRENE LF 75 (Parts by Wt.) | | | 300 | | | |
| ADIPRENE L 275 (Parts by Wt.) | | | | 300 | | |
| ADIPRENE LW 570 (Parts by Wt.) | | | | | | |
| PREPOLYMER OF COMPARATIVE EXAMPLE S (Parts by Wt.) | | | | | | |
| H12MDI (Parts by Wt.) | | | | (a) | 21 | 42 |
| % NCO CONTENT, APPROX. | 6.1 | 7.2 | 8.8 | 9.4 | 8.2 | 9.7 |
| % FREE TDI CONTENT, APPROX. | <0.1 | <0.1 | <0.1 | 1.5 | <0.1 | <0.1 |
| CURATIVE | | | | | | |
| MBOCA (Parts by Wt.) | 55 | 65 | 80 | 80 | 75 | 88 |
| MCDEA (Parts by Wt.) | | | | | | |
| CURATIVE LEVEL, APPROX. (c) | 0.95 | 0.95 | 0.95 | 0.90 | 0.95 | 0.95 |

| EXAMPLE OR COMPARATIVE EXAMPLE | O | P | Q | R | S | 7 | 8 | 9 | 10 |
|---|---|---|---|---|---|---|---|---|---|
| COMPOSITION OF TABLES I AND II | F, F' | E | C | | | | 1, 1' | 2 | 3 |
| PREPOLYMER | | | | | | | | | |
| ADIPRENE ® LF 90 (Parts by Wt.) | 300 | | | | | | | 258 | 237 |
| ADIPRENE LF 95 (Parts by Wt.) | | 300 | | | | 279 | 258 | | |
| ADIPRENE LF 60 (Parts by Wt.) | | | | | | | | | |
| ADIPRENE LF 70 (Parts by Wt.) | | | 300 | | | | | | |
| ADIPRENE LF 75 (Parts by Wt.) | | | | | | | | | |
| ADIPRENE L 275 (Parts by Wt.) | | | | | | | | | |
| ADIPRENE LW 570 (Parts by Wt.) | | | | 300 | | | | | |
| PREPOLYMER OF COMPARATIVE EXAMPLE S (Parts by Wt.) | | | | | 300 | | | | |
| H12MDI (Parts by Wt.) | | | | (b) | (b) | 21 | 42 | 42 | 63 |
| % NCO CONTENT, APPROX. | 3.8 | 6.1 | 8.2 | 7.4 | 6.7 | 8.2 | 9.7 | 7.8 | 9.7 |
| % FREE TDI CONTENT, APPROX. | <0.1 | <0.1 | <0.1 | (b) | (b) | <0.1 | <0.1 | <0.1 | <0.1 |
| CURATIVE | | | | | | | | | |
| MBOCA (Parts by Wt.) | | | | | | | | | |
| MCDEA (Parts by Wt.) | 52 | 80 | 104 | 96 | 86 | 106 | 126 | 100 | 126 |
| CURATIVE LEVEL, APPROX. (c) | 1.01 | 0.97 | 0.94 | 0.95 | 0.95 | 0.95 | 0.95 | 0.95 | 0.95 |

(*) All compositions have been scaled to a basis of 300 parts by wt. total prepolymer for comparison. (PBW = parts by weight)
(a) ADIPRENE ® L 275 prepolymer, 300 parts by weight; contains approx. 23 parts by weight free H12MDI (Comparative Example L)
(b) The prepolymers of Comparative Examples R and S contain H12MDI as the sole diisocyanate.
(c) Curative level is computed as (aromatic amine groups and aliphatic hydrozyl groups)/(all isocyanate groups).

TABLE IV

DYNAMIC PROPERTIES OF CURED ELASTOMERS

| EXAMPLE OR COMPARATIVE EXAMPLE | I | J | K | L | M | N |
|---|---|---|---|---|---|---|
| COMPOSITION OF TABLES I AND II | | A | | | | |
| G': STORAGE MODULUS, DYNES/CM$^2$ | | | | | | |
| 30° C. (× 10$^9$) | 0.66 | 1.0 | 2.8 | 3.7 | 1.8 | 3.0 |
| 100° C. (× 10$^9$) | 0.56 | 0.59 | 1.0 | 1.1 | 0.74 | 1.1 |
| 200° C. | 7.9 × 10$^6$ | 3.0 × 10$^8$ | 5.0 × 10$^8$ | 1.3 × 10$^8$ | 1.6 × 10$^8$ | 9.5 × 10$^7$ |
| 230° C. | 3.0 × 10$^6$ | * | 6.0 × 10$^7$ | * | * | * |
| TANGENT DELTA | | | | | | |
| 30° C. | 0.082 | 0.13 | 0.11 | 0.080 | 0.094 | 0.069 |
| 100° C. | 0.014 | 0.032 | 0.074 | 0.17 | 0.087 | 0.12 |
| 150° C. | 0.010 | 0.025 | 0.031 | 0.070 | 0.037 | 0.073 |
| 200° C. | 0.024 | 0.031 | 0.045 | 0.035 | — | 0.056 |
| 230° | 0.12 | * | 0.093 | * | * | — |
| Local Maximum, 30–150° C. | 0.082 | 0.13 | 0.14 | 0.17 | 0.11 | 0.12 |
| (Temperature, ° C.) | (30° C.) | (30° C.) | (60° C.) | (110° C.) | (70°) | (100° C.) |
| POWER LOSS, ERGS/CM$^3$/SEC | | | | | | |
| 30° C. | 44 | 39 | 13 | 6.7 | 16 | 7.3 |
| 100° C. | 7.6 | 17 | 23 | 48 | 37 | 33 |
| 150° C. | 5.6 | 14 | 13 | 57 | 20 | 42 |
| 200° C. | 26 | 33 | 28 | 81 | — | 186 |
| 230° C. | >4000 | >2000 | 480 | * | * | * |
| Local Maximum, 30–150° C. | 45 | 50 | 29 | 81 | 37 | 50 |
| (Temperature, °C.) | (40° C.) | (50° C.) | (70° C.) | (130° C.) | (120° C.) | (130° C.) |

| EXAMPLE OR COMPARATIVE EXAMPLE | O | P | Q | R | S | 7 | 8 | 9 | 10 |
|---|---|---|---|---|---|---|---|---|---|
| COMPOSITION OF TABLES I AND II | F, F | E | C | | | 1, 1' | 2 | 3 | |
| G': STORAGE MODULUS, DYNES/CM$^2$ | | | | | | | | | |
| 30° C. (× 10$^9$) | 0.45 | 1.2 | 3.7 | 4.1 | 3.1 | 2.4 | 3.5 | 1.9 | 2.9 |
| 100° C. (× 10$^9$) | 0.41 | 0.88 | 2.2 | 0.68 | 0.26 | 1.6 | 2.2 | 1.4 | 2.1 |
| 200° C. | 2.2 × 10$^8$ | 5.1 × 10$^8$ | 1.0 × 10$^9$ | 9.3 × 10$^7$ | — | 7.0 × 10$^8$ | 9.4 × 10$^8$ | 7.3 × 10$^8$ | 1.0 × 10$^9$ |
| 230° C. | 1.1 × 10$^8$ | 2.6 × 10$^8$ | 6.3 × 10$^8$ | — | — | 4.4 × 10$^8$ | 6.1 × 10$^8$ | 5.1 × 10$^8$ | 7.8 × 10$^8$ |
| TANGENT DELTA | | | | | | | | | |
| 30° C. | 0.036 | 0.066 | 0.072 | 0.089 | 0.12 | 0.067 | 0.059 | 0.051 | 0.044 |
| 100° C. | 0.014 | 0.026 | 0.041 | 0.17 | 0.18 | 0.041 | 0.045 | 0.043 | 0.039 |
| 150° C. | 0.017 | 0.027 | 0.041 | 0.19 | 0.028 | 0.037 | 0.045 | 0.049 | 0.044 |
| 200° C. | 0.032 | 0.034 | 0.051 | 0.14 | — | 0.025 | 0.046 | 0.076 | 0.064 |
| 230° | 0.031 | 0.042 | 0.041 | — | — | 0.036 | 0.042 | 0.060 | 0.056 |
| Local Maximum, 30–150° C. | 0.036 | 0.066 | 0.072 | 0.19 | 0.25 | 0.067 | 0.059 | 0.051 | 0.044 |
| (Temperature, ° C.) | (30° C.) | (30° C.) | (30° C.) | (150° C.) | (80° C.) | (30° C.) | (30° C.) | (30° C.) | (30° C.) |
| POWER LOSS, ERGS/CM$^3$/SEC | | | | | | | | | |
| 30° C. | 25 | 17 | 6.1 | 6.7 | 12 | 8.8 | 5.3 | 8.4 | 4.8 |
| 100° C. | 11 | 9.1 | 6.0 | 77 | 210 | 7.9 | 6.3 | 9.8 | 5.9 |
| 150° C. | 14 | 12 | 8.2 | 342 | 170 | 9.8 | 8.8 | 16 | 8.6 |
| 200° C. | 45 | 21 | 16 | 477 | — | 11 | 16 | 33 | 20 |
| 230° C. | 9 | 52 | 20 | — | — | 26 | 22 | 37 | 22 |
| Local Maximum, 30–150° C. | 25 | 18 | 8.2 | 342 | 251 | 10.4 | 8.8 | 16 | 8.6 |
| (Temperature, °C.) | (30° C.) | (40° C.) | (150° C.) | (150° C.) | (120° C.) | (90° C.) | (150° C.) | (150° C.) | (150° C.) |

*Sample Softened

COMPARATIVE EXAMPLES I–S

EXAMPLES 7–10

DYNAMIC PROPERTIES OF ELASTOMERS

The following Examples and Comparative Examples illustrate the superior dynamic properties of elastomers obtained from MCDEA and prepolymers based on both TDI and H12MDI. This result is surprising in that prior art H12MDI-based prepolymers typically give elastomers with inferior dynamics.

The compositions of these Examples are listed in Table III. The dynamic properties measured on the cured elastomers are summarized in Table IV.

Experimental Procedure

In Examples 1–6 and Comparative Examples A–H above, the mixtures of prepolymer and curative were allowed to fully cure in the metal can containers in which they were mixed. In the following Examples and Comparative Examples, some of these compositions were cast into slabs for testing of the physical/mechanical properties of the final cured elastomers. Except where otherwise noted, the following procedures were used.

The mixtures of prepolymer and curative were prepared at a curative level of 0.95±0.06.

The mixtures were then poured into aluminum molds preheated to 100° C.–115° C. to prepare sheets about 0.075 inches thick. The sheets were cured for about 16 hours at 100° C.–115° C. They were demolded when they attained sufficient strength, and stood at room temperature for at least 7 days before physical testing.

Dynamic mechanical properties were determined on a Rheometrics dynamic mechanical spectrometer under conditions of 1% strain and 10 Hz frequency. Properties measured included storage modulus, loss modulus, and tangent delta. From these properties, a comparative power loss also may be calculated.

Storage Modulus, G' in Table IV, is given in units of dynes/cm². In practical applications, such as paper mill rolls and other dynamic applications, it is desirable that G' remain constant over the range of 30° C. to 230° C., and especially from 30° C. to 150° C. If G' decreases too much over this range, articles in dynamic service may fail from heat buildup.

Tangent Delta is a dimensionless number indicating hysteresis. Lower values are typically desired throughout the temperature range from 30° C. to 230° C., and especially from 30° C. to 150° C.

Power Loss may be calculated from the Storage Modulus and the Tangent Delta values, assuming a given applied stress and a given rate at which the stress is applied (for example, 100,000 dynes/cm² stress applied cyclically at a rate of 10 Hz). Power loss may be expressed in cgs units of ergs/cubic cm/second. It is an absolute value for the hysteresis under these controlled conditions. Low values for power loss over the range from 30° C. to 230° C. and especially 30° C. to 150° C. are desirable for most dynamic applications.

Polyurethane elastomers are often selected for use according to their hardness or modulus at about 30° C. Therefore, it is appropriate to compare the elastomers in the Examples and Comparative examples that follow according to similar storage modulus.

COMPARATIVE EXAMPLES I through N

MBOCA-Cured Elastomers

In these comparative examples the limited dynamic performance of elastomers prepared from MBOCA and various prepolymers is illustrated.

In Comparative Examples I, J, and K, three prepolymers consisting primarily of TDI and PTMEG and containing below 0.1% free TDI were cured with MBOCA. These prepolymers provided elastomers with a broad range of storage modulus at 30° C. (0.66 to 2.8×10⁹ dynes/cm²). These compositions are employed in commercial dynamic applications including industrial rolls.

The dynamic properties of these materials are considered to be acceptable for many dynamic applications, but further improvement is desirable. In the normal operating range of 30° C. to 150° C., power loss reaches local maximum values as high as 29 to 50 ergs/cm³/sec. This range of values is high enough to permit articles such as industrial rolls to develop high internal temperatures under certain operating conditions. If the internal temperature reaches the range 200° C. to 230° C., catastrophic deterioration of the roll can result. The storage modulus of the elastomer decreases sharply (i.e., the material softens sharply), and the power loss increases drastically. At this point the elastomer is likely to increase further in temperature, then fail by such mechanisms as tearing or melting.

Comparative Example L shows the dynamic performance of a prior art prepolymer prepared with both TDI and H12MDI. In contrast to the prepolymers of the present invention, this prior art prepolymer contains a high level of free TDI (about 1.5%). This commercial prepolymer, Adiprene L 275, is widely used with MBOCA curative to produce industrial rolls for conditions of dynamic service. However, the dynamic properties of this TDI/H12MDI prepolymer are recognized to be inferior to those of pure TDI-based prepolymers with similar room-temperature storage modulus or hardness, such as Adiprene LF 75 (Comparative Example K). Power loss in the temperature range 30° C. to 150° C. peaks at 81 ergs/cm³/sec for L, vs. only 29 ergs/cm³/sec for K. In the temperature range 200° C. to 230° C., L loses storage modulus (softens) and increases in power loss more drastically than does K. The inferior dynamics of this TDI/H12MDI composition L are attributed to the presence of H12MDI.

Comparative Examples M and N show the dynamic properties of elastomers prepared from MBOCA and low free TDI prepolymers containing added H12MDI. It is seen that these elastomers do show improved dynamic properties compared to the elastomer of Comparative Example L, but that they are deficient to the all-TDI elastomer of Comparative Example K. (Elastomers K and N are an appropriate comparison because they have similar storage modulus at 30° C.) Again, the inferior dynamics of elastomer N (TDI/H12MDI) vs. elastomer K (all TDI) are attributed to the presence of H12MDI in elastomer N.

COMPARATIVE EXAMPLES O Through S

MCDEA-Cured Elastomers

In these examples the dynamic performance of elastomers prepared with MCDEA and prior art prepolymers is presented.

Comparative Examples O, P, and Q show the excellent dynamic performance of three elastomers prepared with MCDEA and three low free TDI prepolymers. These prepolymers consist primarily of PTMEG and TDI and contain below 0.1% free TDI monomer. A broad range of storage modulus at 30 Celsius is covered by these elastomers (0.45 to 3.7×10⁹ dynes/cm²). In all cases the dynamic properties are considered excellent. In the temperature range 30° C. to 150° C., power loss remains at or well below 25 ergs/cm³/sec. In the temperature range 200° C. to 230° C., power loss remains low and storage modulus remains high.

(Note, however, that the compositions of O, P, and Q were also studied for processability in Comparative Examples F, F', E, and C. In each case, short pour life and propensity to crack were observed. These deficiencies remain to be overcome.)

Comparative Examples R and S show the inferior dynamics of elastomers prepared with MCDEA and prior art H12MDI prepolymers. The known inferiority of H12MDI to TDI in dynamics, illustrated previously for MBOCA-cured elastomers (Comparative Examples L, M, N), is now illustrated for MCDEA-cured elastomers of prior art prepolymers of H12MDI.

In Comparative Example R, a commercial prepolymer (Adiprene LW 570), consisting primarily of PTMEG and H12MDI, was cured with MCDEA. In the temperature range 30 to 150° C., power loss reached the unsatisfactory level of 342 ergs/cm³/sec and continued climbing at higher temperatures.

Comparative Example S illustrates the limited improvement in dynamics that is obtained when H12MDI prepolymer is prepared by reacting a polyol with a large excess of H12MDI, and the excess unreacted H12MDI monomer 15 is removed before the prepolymer is cured with MCDEA. The dynamics, while improved, remain poor.

In a one-gallon metal can, 650 grams (1 mole) of PTMEG 650 was stirred into 2620 grams (10 moles) of H12MDI (Desmodur W from Miles Inc.) The contents were sealed under a dry nitrogen flush and allowed to react in a 70° C. oven for about 48 hours, and then transferred to a 115° C. oven for about 4 hours. The mixture was then degassed in a vacuum chamber and allowed to cool to room temperature. A second quantity of material was made using 75% loadings of each reactant. Isocyanate (NCO) contents of these two materials were 22.93% and 23.13%, respectively.

The combined prepolymers were then treated on a thin film evaporation apparatus to remove unreacted H12MDI monomer. The combined treated product had an NCO content of about 6.7%. Its viscosity was considerably lower than that of Adiprene LW 570. A viscosity of 940 centipoise was obtained by heating this prepolymer to a temperature of 70° C.; with Adiprene LW 570, a temperature of about 100° C. is required for this viscosity.

The prepolymer was cured with MCDEA and the resulting elastomer characterized for dynamics. Power loss reached the high value of 251 ergs/cm³/sec at 120° C. temperature. While lower than the power loss of Comparative Example R, this value is still considered unsatisfactory for many dynamic applications.

Thus, Comparative Example R and S show dynamics to be very inferior when H12MDI-based prepolymers are used in place of TDI-based prepolymers, even in conjunction with MCDEA curative.

EXAMPLES 7 THROUGH 10

MCDEA-Based Elastomers

THE INVENTION

These examples show the excellent dynamic properties that are obtained with elastomers based on MCDEA curative and TDI/H12MDI prepolymers low in free TDI monomer content.

The TDI/H12MDI prepolymers in these Examples were obtained by blending low free TDI prepolymers (Adiprene® grades LF 95 or LF 90) with H12MDI in various weight ratios ranging from 7% to 21% H12MDI.

Surprisingly, despite the incorporation of significant amounts of H12MDI, power loss is consistently low in these compositions. In the temperature range 30° C. to 150° C., no composition shows power loss greater than 16 ergs/cm³/sec. In the temperature range 200° C. to 230° C., power loss remains low (below 40 ergs/cm³/sec in all cases); storage modulus and hardness remain high.

The compositions of Examples 8, 9, and 10 were previously studied for their processing characteristics in Examples 1, 1', 2, and 3. Thus, the compositions described (H12MDI/TDI prepolymers with low levels of free TDI monomer, suitable for curing with MCDEA) are unique in providing the following important advantages:

(1) resistance to cracking during the cure stage
(2) long pour life
(3) low levels of toxic, volatile free TDI monomer in the prepolymer
(4) excellent dynamic properties in the elastomer.

It will be readily apparent to the skilled practitioner in the art that many modifications and changes can be made to the embodiments specifically documented herein. Such modification and changes are a part of the invention if they fall within the scope of the invention defined in the appended claims hereto.

What is claimed is:

1. A polyurethane elastomer formed by the reaction of an organic diisocyanate prepolymer having low free toluene diisocyanate prepared by a process comprising the steps of:

(a) reacting a molar excess of one or more isomers of toluene diisocyanate with a high molecular weight polyol selected from the group consisting of polyalkyleneether polyol and polyester polyol at between about 30° C. and 150° C. for a time sufficient to form a high free toluene diisocyanate prepolymer; and (b) reducing the free toluene diisocyanate level of said high free toluene diisocyanate prepolymer to less than 0.4 percent to form a low free toluene diisocyanate prepolymer; and (c) adding to said low free toluene diisocyanate prepolymer an aliphatic diisocyanate selected from the group consisting of the isomers of 1,1'-methylene-bis-(4-isocyanatocyclohexane), 1,4-cyclohexane diisocyanate, isophorone diisocyanate 1,3-xylylene diisocyanate, or 1,1,4,4-tetramethylxylylene diisocyanate, with a curingly effective amount of a curative containing 4,4'-methylene-bis-(3-chloro-2,6-diethylaniline).

2. A polyurethane elastomer formed by the reaction of:

a) an isocyanate endcapped polyalkylene ether polyol or polyester polyol prepolymer having a molecular weight between about 650 and about 3000; and (b) a curative blend consisting essentially of from about 95 to 5 percent by weight of 4,4'-methylene-bis-(3-chloro-2,6-diethyl-aniline) and 5 to 95 percent by weight of a second aromatic diamine curative selected from the group consisting of 4,4'-methylene-bis-(2-chloroaniline), dimethylthiotoluenediamine, trimethylene glycol di-p-aminobenzoate, diethyltoluenediamine, and 1,2-bis-(2-aminophenylthio)ethane.

3. A polyurethane elastomer formed by the reaction of:

a) an isocyanate endcapped polyalkylene ether polyol or polyester polyol prepolymer; and b) a curative blend comprising 70 to 90 percent by weight of 4,4'-methylene-bis-(3-chloro-2,6-diethylaniline) and 30 to 10 percent by weight of 4,4'-methylene-bis-(2-chloroaniline).

* * * * *